United States Patent

[11] 3,627,052

| [72] | Inventor | Raoul Georges Duquenne<br>3, rue Ligny, Gaurain-Ramecroix, Belgium |
|---|---|---|
| [21] | Appl. No. | 886,588 |
| [22] | Filed | Dec. 19, 1969 |
| [45] | Patented | Dec. 14, 1971 |
| [32] | Priorities | Dec. 19, 1968 |
| [33] | | Belgium |
| [31] | | 67713;<br>Dec. 12, 1969, Belgium, No. 82686 |

[54] MACHINE FOR LIFTING BEETROOTS
11 Claims, 16 Drawing Figs.

[52] U.S. Cl. ......................................................... 171/101,
56/121.45
[51] Int. Cl. ........................................................ A01d 23/00
[50] Field of Search .......................................... 171/101,
63, 42; 56/121.4, 121.44, 121.45, 121.46

[56] References Cited
UNITED STATES PATENTS

| 3,435,900 | 4/1969 | Weichel | 171/101 |
| 1,309,940 | 7/1919 | Hannum | 171/101 |
| 3,431,979 | 3/1969 | Gregerson | 171/63 |
| 412,490 | 10/1889 | Ford | 171/101 |
| 2,072,186 | 3/1937 | Sishc | 56/121.45 |

FOREIGN PATENTS

| 567,033 | 5/1958 | Belgium | 171/101 |
| 1,397,356 | 3/1965 | France | 56/121.44 |

Primary Examiner—Antonio F. Guida
Attorney—Young & Thompson

ABSTRACT: Apparatus for digging beets and other underground objects, comprises a transverse series of blades for cutting off the beet leaves at their base, one blade for each beet row, followed by an endless rake for gathering the beet leaves, and oppositely pitched transversely extending helical conveyors for moving the beet leaves toward centrally positioned longitudinally extending conveyors that deliver the beet leaves to a bin at the rear of the apparatus. A transverse row of diggers behind the blades digs the objects from the ground, and openwork rotors behind the diggers move the objects centrally and rearwardly toward a shelf elevator conveyor which delivers them into a bin that can be discharged by tipping or by a scraper conveyor.

Patented Dec. 14, 1971

INVENTOR
RAOUL GEORGES DUQUENNE
By Young + Thompson
ATTYS.

Patented Dec. 14, 1971

FIG_2B

INVENTOR
RAOUL GEORGES DUQUENNE
BY Young & Thompson
Attys.

FIG_9

FIG_10

INVENTOR
RAOUL GEORGES DUQUENNE
BY Young & Thompson
ATTYS

MACHINE FOR LIFTING BEETROOTS

The present invention relates to a machine for digging beets or the like. This machine is of the multirow type, which is to say that several adjacent rows of beets may be dug simultaneously.

The machine of the invention comprises on the one hand means for cutting and removing beet leaves, and on the other hand means to dig and remove beets from the soil.

Machines embodying some of the above characteristics are already known. Thus, in multirow machines of known types, the means to cut the beet leaves comprise a series of transverse knives corresponding respectively to the adjacent rows of beets, these knives being mounted in front of the machine and disposable at a regulable height relative to the ground by rotary feelers that are transversely aligned and disposed in front of the knives. The means to remove the cut leaves comprise one or more transverse conveyors receiving the cut leaves from the knives and delivering them to the side of the machine as the latter advances.

These known machines have the disadvantage of depositing the cut leaves in rows parallel to the beet rows and not in spaced piles. It is therefore necessary subsequently to gather the cut leaves even if the leaves are considered to be a waste product.

In known machines, the means to dig the beets from the soil comprise pairs of ploughs inclined toward each other and spaced from each other and mounted on a common transverse support that is regulable as to height. The means for remove the dug beets also remove them laterally. As also with the leaves, the known machines have the disadvantage of depositing the beets in rows parallel to the rows of growing beets as the machine advances. As a result, these machines also require a supplemental work operation to gather the dug beets from the rows in which they lie.

Also, the machines known heretofore have been limited to digging simultaneously at most four rows of beets.

The present invention provides a new beet digging machine which is especially effective and productive and which permits the simultaneous digging of six or more rows of beets, automatically and without the need for skilled personnel, and not only cuts the beet leaves and digs the beets but also gathers the cut leaves and the dug beets in suitable containers which may be removed from the machine and transported in trucks or from which the beets may be readily emptied. It goes without saying that this new machine is thus a great advance over known machines of this type.

To this end, the new machine of the present invention comprises in combination means to cut beet leaves at their base, means to remove the cut leaves, means to dig beets from the soil and means to remove the dug beets, all these means functioning simultaneously as the machine advances to accumulate cut leaves and dug beets in suitable collection receptacles.

In this new machine, the means to cut the beet leaves at their base comprise a series of transverse knives corresponding respectively to the beet rows, these knives being mounted before the machine and adjustable as to height so as to be situated at the level of the base of the leaves under the control of rotatable feelers mounted before the knives and aligned with each other transversely of the direction of travel of the machine.

Also in the new machine, means to remove the cut leaves comprise endless collecting rakes mounted behind the knives and transversely aligned with each other. These rakes carry the leaves rearwardly and upwardly to conveyor means including one or more successive longitudinal endless conveyors that extend substantially along the vertical longitudinal medial plane of the machine and that terminate above a first collecting bin mounted substantially symmetrically with respect to the midplane, which accumulates the leaves dumped into it.

Also in the new machine, the means to dig the beets comprise pairs of ploughs and/or discs inclined toward each other and spaced from each other. These pairs of ploughs are mounted adjustably as to height on a transverse support and are disposed behind the transverse knives.

Further in the new machine, the means to remove the dug beets are comprised by at least two openwork rotary conveyors mounted behind the pairs of ploughs and disposed symmetrically on opposite sides of the midplane of the machine. These rotary conveyors deliver the beets to the lower portions of at least two elevator conveyors disposed symmetrically with respect to the said midplane. The upper portions of the elevators are located above a second collecting bin which is centered with respect to the midplane of the machine, which second bin accumulates in turn the beets which are dumped into it.

Also in the new machine, it is preferred that the first collecting bin be disposed behind the machine, that the second collecting bin be disposed between the front and rear wheels of the machine above the pairs of ploughs and rotary conveyors, and that the elevator conveyors be mounted substantially vertically and in front of the rear wheels of the machine.

Thanks to the substantially symmetrical arrangement of the elements constituting this embodiment of the invention, with respect to the longitudinal midplane thereof, and in particular thanks to the judicious placement of the screw conveyors and of the longitudinally extending conveyor or conveyors, of the first collecting bin for leaves, of the rotary conveyors, of the elevator conveyors and of the second collecting bin for beets, the machine has the advantage of being of compact construction and good stability over practically any terrain.

According to another feature of the invention, the means to remove the cut leaves comprise a transverse helical conveyor having two helices of opposite sense and of relatively small pitch and two coaxial transverse helical conveyors having two helices of reverse sense and relatively great pitch and disposed just to the rear of the first-mentioned helical conveyor. These helical conveyors receive leaves from the endless rake and deliver the leaves onto the longitudinally extending medial conveyor or conveyors.

Each of the openwork rotary conveyors for dug beets is preferably of a shape that enlarges toward the base, for example in the manner of a truncated cone. The arms are preferably bent so as to flare toward the base; and to this end, each rotor may be comprised by a plurality of regularly spaced rods inclined so as to diverge downwardly from the axis of the rotor and to be inclined toward the rear with respect to the direction of rotation. It has been found that with rotors of this type, the beets, whose shape varies, are more easily disengaged from the periphery of the rotors and accordingly better transferred to the elevator conveyors. There is thus less danger of the rotors becoming clogged with beets which cannot be removed by the elevator conveyors. It has also been discovered that the risk of damage to beets by the rotors is greatly reduced when the rotors are constructed in this way.

To permit the dug beets to be more readily conveyed by the rotors, a rotatable disc or wheel having beet guide means thereon is preferably provided in the vicinity of each rotor near the ploughs. These discs help remove dirt from the dug beets. Such a disc is also advantageously provided near each elevator conveyor, in the vicinity of the corresponding rotor, this latter disc or wheel facilitating the transfer of beets from a given rotor to its associated elevator conveyor.

So as to facilitate the discharge of leaves and beets from their respective collection bins and to load them for example into a truck, each bin is laterally pivotally mounted relative to the chassis and is rockable for example by a hydraulic jack controlled by an electrically actuated distribution valve of the fluid motor. This valve may be actuated by a pushbutton located on the dashboard of the cab or by a lever pivoted to the chassis and elastically supported in a position laterally projecting from the machine at a predetermined height from the ground.

At the same time, the medially disposed collecting bin for the beets may be emptied without swinging and while remaining in its upright position or in another desired position on the chassis. In this case, the bin is provided with discharge scrapers mounted on rods connecting two parallel endless chains. The chains are disposed respectively near the forward and rear walls of the bin and extend close to one of the side faces and are synchronously driven. The chain drive may be actuated by a pushbutton on the dashboard of the cab.

Other features and advantages of the invention will become apparent in the course of the description of the accompanying drawings which show schematically and merely by way of example several embodiments of the invention. In the drawings.

In the various figures, the same reference numerals designate the same parts.

The machine shown in FIGS. 1—6 serves to dig beets 1 from the soil of a cultivated field. This machine comprises various mechanisms carried by a chassis 2 mounted on two series of wheels. In the illustrated example, the forward series of wheels is constituted by six front wheels 3 driven and arranged in pairs. These front wheels 3 are driven by an internal combustion engine or motor 4 through a known transmission (not shown). The motor 4 is controlled from the operator's cab 5. At the other end of the machine, a series of rear wheels is constituted by two rear wheels 6 which are steered by conventional hydraulic cylinders controlled from the operator's cab. The rear wheels 6 could also be power driven, for example by the motor 4.

The front wheels 3 are transversely aligned and spaced from each other according to the spacing of the rows of beets, the wheels 3 thus being disposed between the rows of beets. At the other end, the rear wheels 6 are also transversely aligned and correspondingly spaced.

The machine comprises means to cut the leaves from beets 1 at the base of the leaves and means to remove the cut leaves. These means to cut the leaves of beets 1 are disposed in front of the machine and are mounted on a frame 7 which is pivotally supported on the chassis 2 about pivots 8 under the action of pneumatic jacks 9 controlled from the operator's cab. These cutting means comprise a series of transverse blades 10 each of which is in the form of a horizontal strip. The transverse blades 10 are carried on arms 11 fixed to frame 7 of chassis 2.

In order to position the blades at the level of the base of the leaves of the beets, the transverse blades are adjustable as to height during movement of the machine. These height adjustments so as to regulate the position of the blades relative to the leaves are effected by rotatable feelers constituted by toothed wheels 12 transversely aligned on a common axis perpendicular to the beet rows and arranged in six groups corresponding each to a beet row. In each of these groups, the toothed wheels 12 are mounted on a common rotatable shaft 13 that rotates in a bearing on an arm of the frame 7. There are six such shafts 13 carrying toothed wheels 12 and these are coaxial and rotated by the motor 4 by means of a multiple chain transmission. In the illustrated embodiment, this transmission includes a reducer 14 driving a connection 15 which turns a first principal transmission shaft 16 mounted on the medial portion of chassis 2. A first endless transmission chain 17 mounted on two sprockets 18 and 19 is driven by shaft 16 to drive the second intermediate drive shaft 20 which extends full width of the machine and rotates in bearings carried by the frame 7. This second transmission shaft 20 also is connected mechanically to third transmission shafts 21 by second endless transmission chains 22 on corresponding sprockets 23 and 24, these third transmission shafts 21 being mounted on arms carried by frame 7 and corresponding each to a said group of toothed wheels 12. Finally, third transmission chains 25 carried by sprockets 26 and 27 are driven by third transmission shafts 21 to rotate the shafts 13 of the toothed wheels 12.

It should be noted that the arms carrying shafts 13 of the toothed wheels 12 each carry at their forward end a guide wheel 28 mounted on a pivot 29 on the said end.

Figure 1:
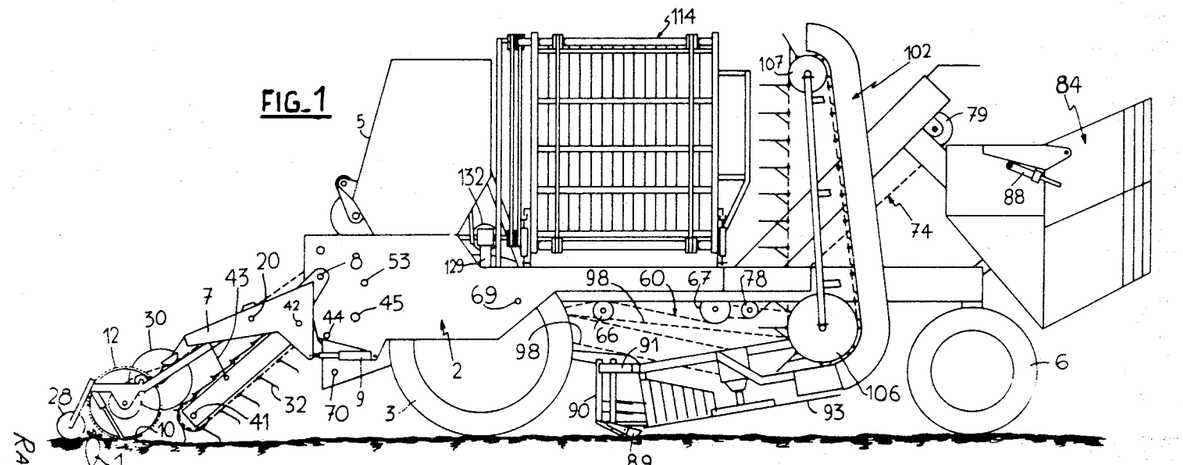
FIG. 1 is an elevational longitudinal view of an agricultural machine according to the invention.
Figure 2A:
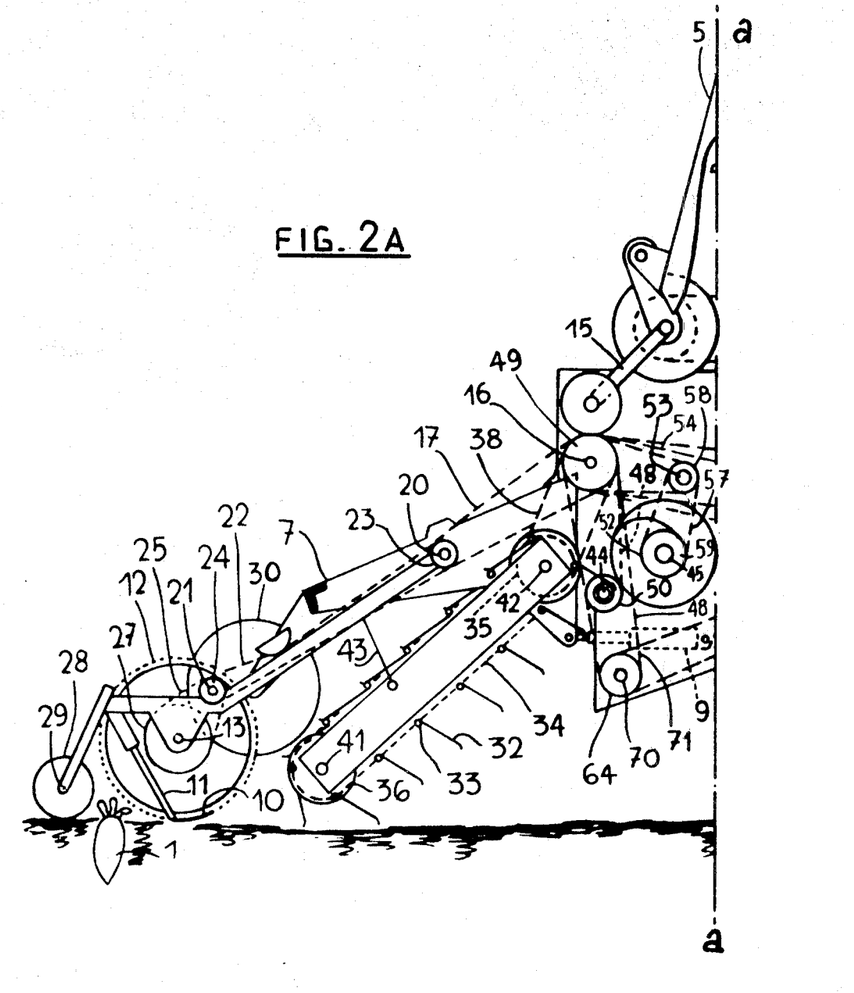
FIGS. 2a, 2b, 2c and 2d are enlarged fragmentary views of four portions of the machine, that can be joined along the lines a—a, b—b and c—c to form a single elevational view of the overall machine.
Figure 2B:
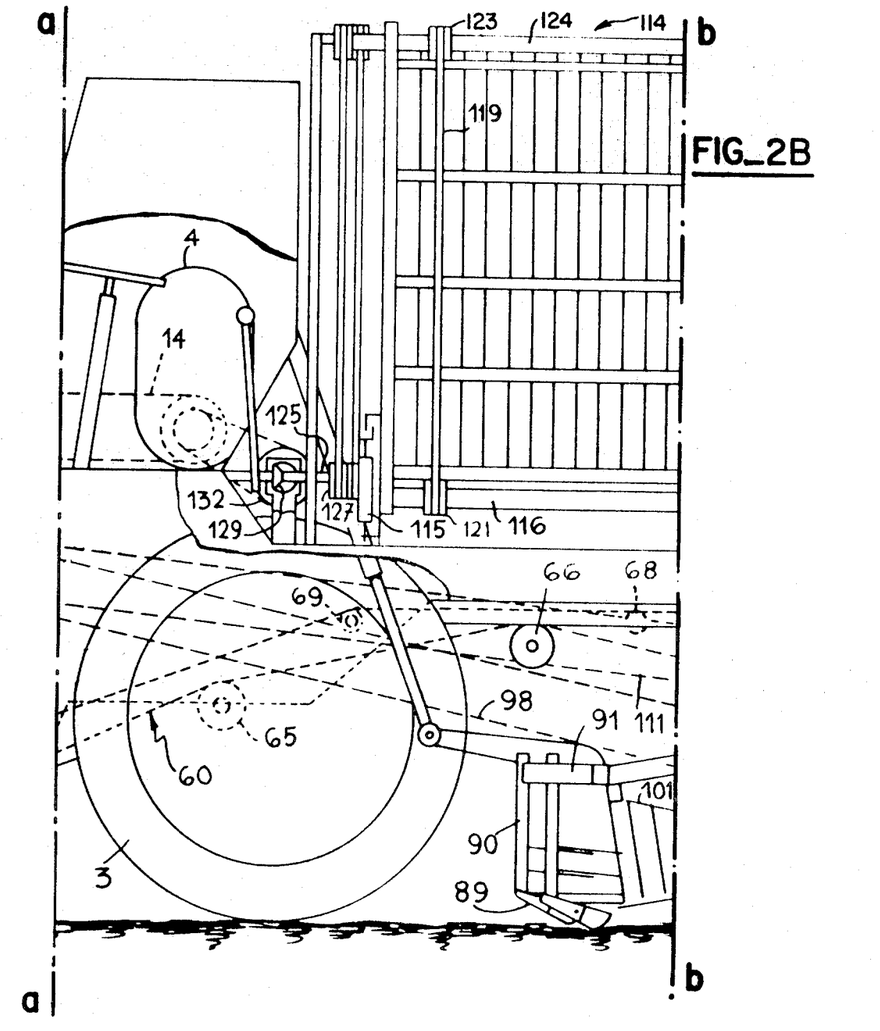
Figure 2C:
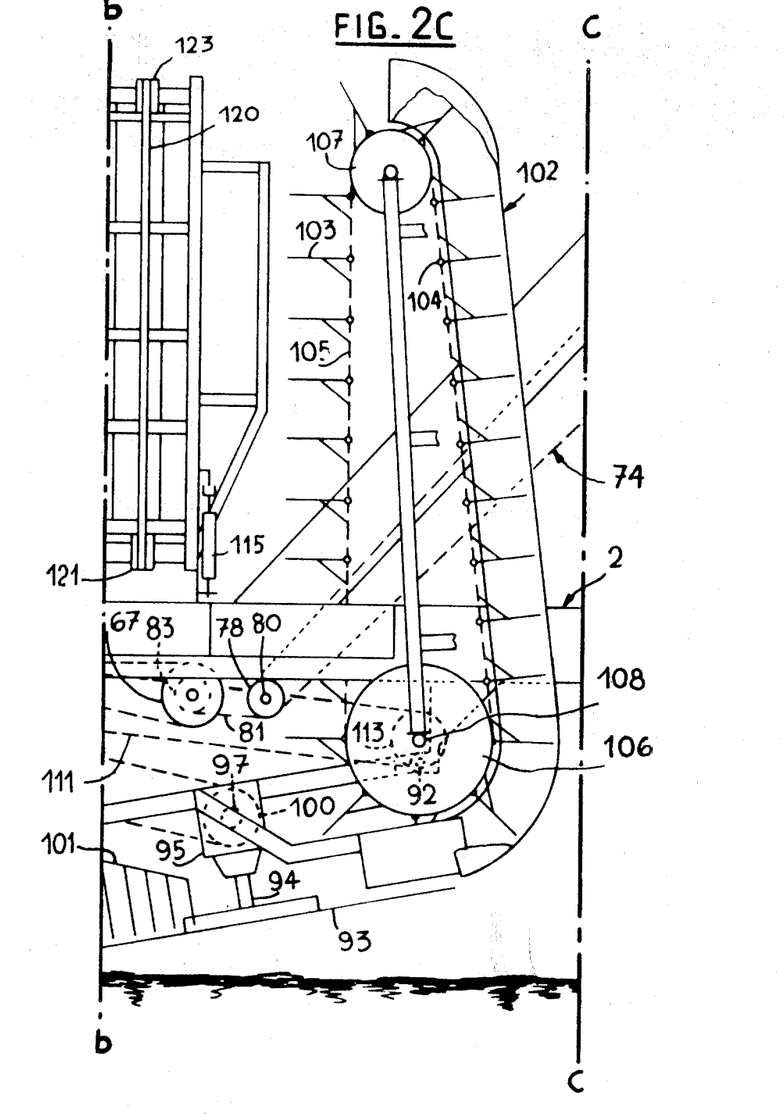
Figure 2D:
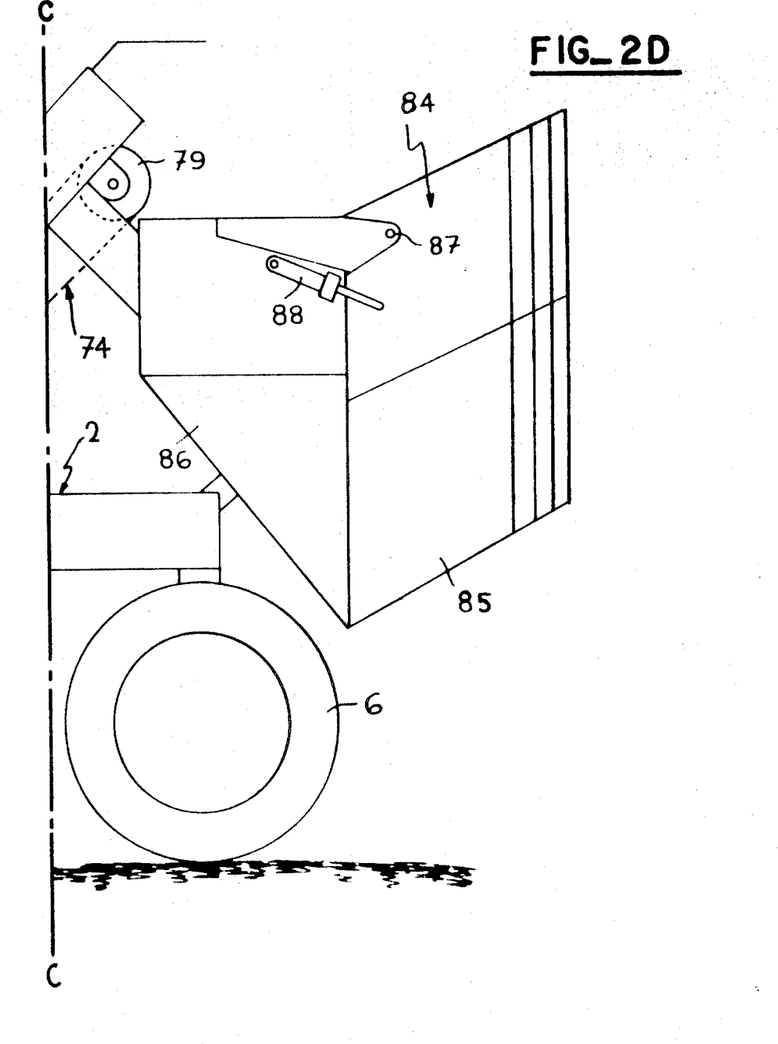
Figure 3:
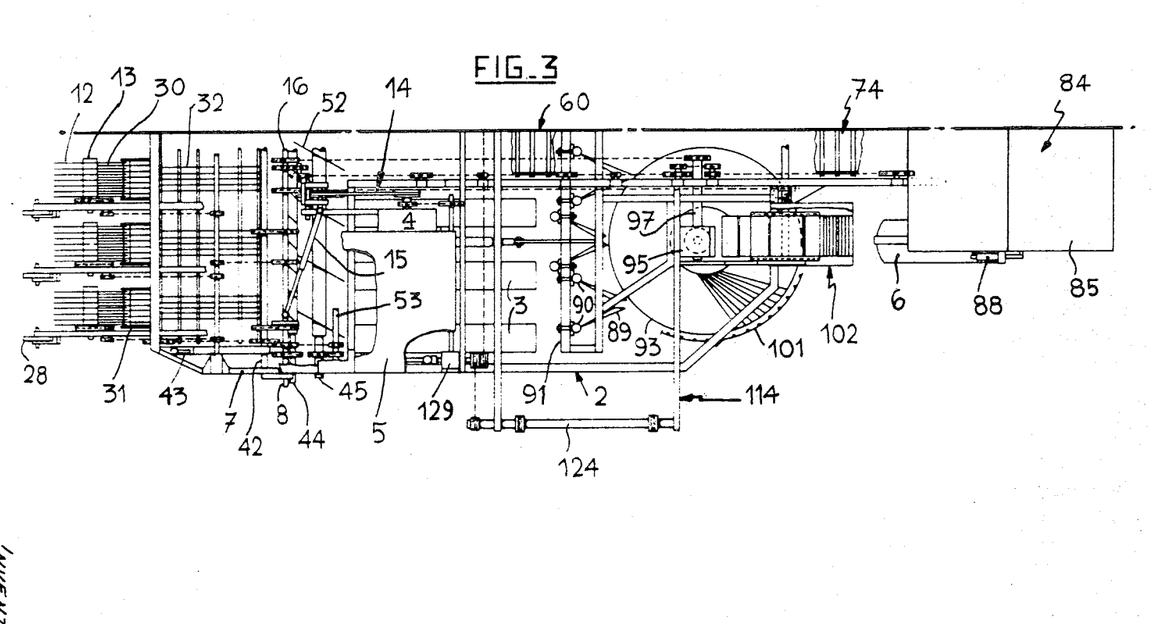
FIG. 3 is a view in plan of the machine of the present invention on one side of the vertical longitudinal midplane thereof.
Figure 4A:
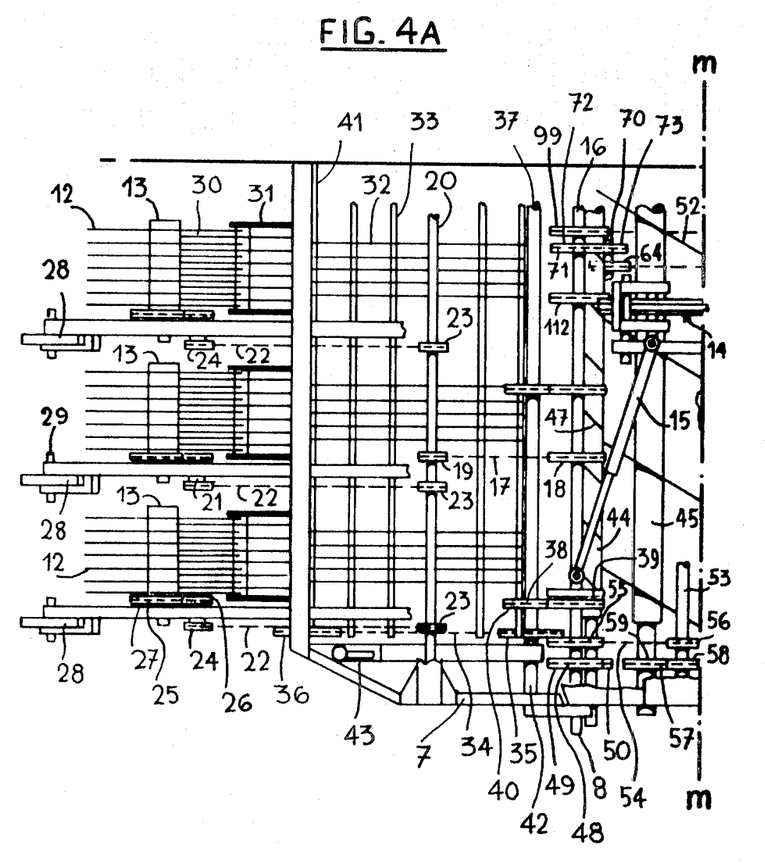
FIGS. 4a, 4b, 4c and 4d are partial views related to FIG. 3 as FIGS. 2a-2d are related to FIG. 1, and may be assembled along the lines m—m, n—n and p—p.
Figure 4B:
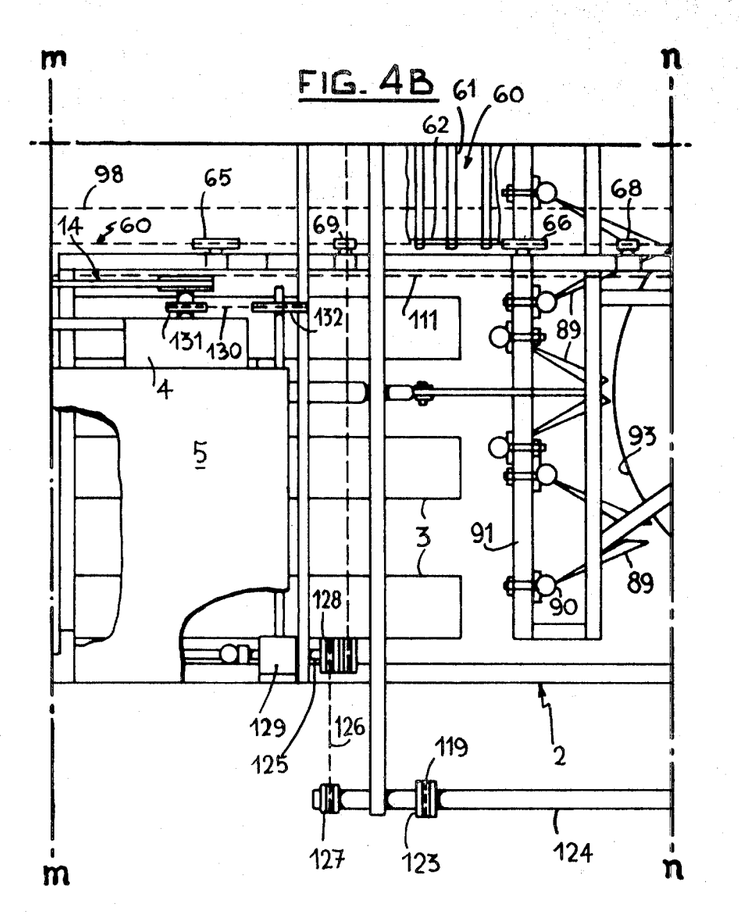
Figures 4C, 4D:
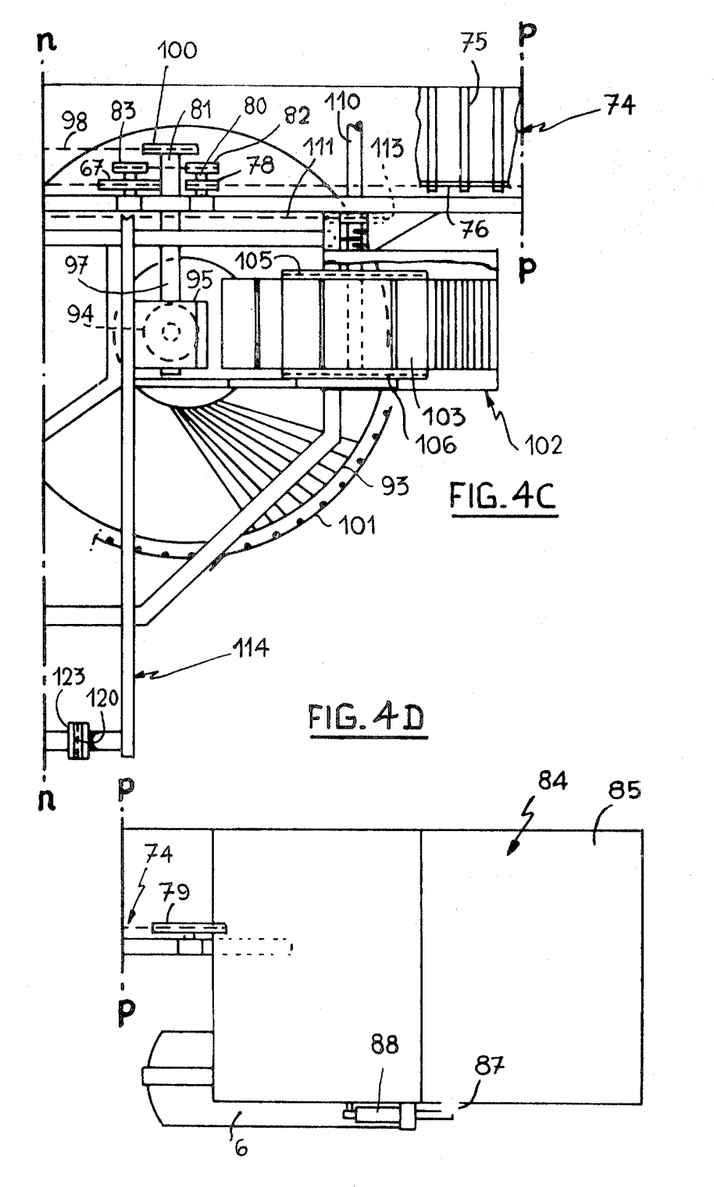

As seen in FIG. 2a, the transverse blades 10 are disposed substantially tangential to the toothed wheels 12 a little to the rear of the transverse axis of rotation of the wheels 12. Thus when the toothed wheels 12 of the said rotatable feelers move vertically while rolling and advancing over the beets whose leaves are to be cut, the knives 10 follow the level of these wheels and are thus disposed at the level of the base of the leaves of the beets.

The leaves which are thus cut by the transverse blades 10 are pushed to the rear by toothed wheels 12 of the rotatable feelers but are prevented from becoming stuck between the wheels 12 by rotatable discs 30 disposed respectively between the toothed wheels 12 and mounted on supports 31 carried by the forward frame 7.

Means are provided for carrying the cut leaves away, in the form members endless gathering rakes 32 extending full width of the machine. The rakes 32 have tines which are transversely aligned and are pivotally supported on cross rods 33 which interconnect at least two endless parallel drive chains 34. The chains 34 in turn are carried each by a driven sprocket 35 and an idler sprocket 36 and are synchronously driven by motor 4. Shaft 37 of driven wheels 35 is driven by first shaft 16 through a transmission including an endless transmission chain 38 carried by sprockets 39 and 40. Also, rotatable shafts 37 and 41 of sprockets 35 and 36 are mounted on other arms carried by frame 7, which arms are mounted for coaxial swinging movement about pivots 42 relative to frame 7. The latter arms are suspended by members 43 by which their inclination is regulable relative to the ground.

The gathering rakes 32 are transversely aligned and disposed rearwardly of the transverse blades 10 and of the toothed wheels 12 of the rotatable feelers. These rakes 32 thus carry the cut leaves upwardly rearwardly, to a point above a helical conveyor 44 and adjacent two coaxial screw conveyors 45, as best seen in FIG. 2a. The conveyor 44 extends full width of the machine and receives from all the rakes 32 and extends full length of the screw conveyors 45. Screw conveyor 44 has two helical flights 46 and 47 which are mirror images of each other and are thus oppositely wound and are of relatively small pitch and relatively small diameter. Conveyor 44 is rotated by motor 4 through a transmission comprising an endless transmission chain 48 carried by a drive sprocket 49 keyed to the principal transmission shaft 16 and also carried by an idler sprocket 50 which is keyed to the shaft of conveyor 44 itself.

The two helical conveyors 45 each extend across half the width of the machine on opposite sides of the longitudinal midplane thereof and comprise two helical flights 51 and 52 having relatively large pitch and relatively large diameter. The flights 51 and 52 are mirror images of each other and hence are oppositely wound and are both driven by motor 4 by means of a further multiple transmission train, also from the shaft 16 through an intermediate transmission shaft 53 driven by shaft 16 by means of an endless transmission chain 54 carried by sprockets 55 and 56 and driving the conveyors 45 by means of an endless transmission chain 57 on sprockets 58 and 59.

The cut leaves transported by the rakes 32 are delivered onto the conveyor 44 and to the forward portion of conveyors 45, which rotate in a direction to move the leaves centrally of the machine where they are delivered to a central longitudinal conveyor 60 which carries them farther to the rear. Conveyor 60 is of the scraper type having transverse scraper bars 61 which are equally spaced and that interconnect two endless drive chains 62 and 63 which are parallel to each other and driven in synchronism. Drive chains 62 and 63 are each mounted on a driven sprocket 64 and pass about idler sprockets 65, 66, 67, 68 and 69. The driven shaft 70 of the drive sprocket 64 is driven by motor 4 through a chain transmission including an endless chain 71 carried by sprockets 72 and 73. Conveyor 60 is preferably symmetrically disposed with respect to the longitudinal midplane of the machine.

Conveyor 60 is in effect extended rearwardly by a second longitudinal conveyor 74 of the same type as conveyor 60 and comprising transverse equally spaced scrapers 75 interconnecting two parallel synchronously driven endless chains 76 and 77 each of which is mounted on a forward drive sprocket 78 and on a rear idler sprocket 79. Drive shaft 80 of the drive sprockets 78 is driven by a transmission chain 81 engaged with a sprocket 82 mounted on shaft 80 and on a sprocket 83 keyed for example to the shaft of sprockets 67.

Conveyor 74 extends upwardly rearwardly and is also centered on the machine. Conveyor 74 receives leaves from conveyor 60 and conveys them to and deposits them in a rear collection bin 84 which is mounted on the rear of the machine behind the rear wheels 6. Bin 84 is preferably fixedly mounted on chassis 2 and in the illustrated embodiment has a rear portion 85 which is pivoted on a fixed portion 86 about coaxial pivots 87. Thus the bin 84 is opened by pivoting the rear portion 85 under the influence of a hydraulic jack 88 pivotally connected to the two parts 85 and 86 and supplied with hydraulic fluid under pressure through an electrovalve controlled from the operator's cab.

In a modification, the rear bin 84 may swing laterally of the chassis 2 for example under the influence of corresponding hydraulic jack. In this case, the lateral swinging of the bin 84 may be controlled by a lever (not shown) pivotally mounted on the chassis. In this case, the lever is resiliently maintained in a laterally extending position with respect to the machine and at a predetermined height above the ground. In this fashion, the said lever could contact a pile of leaves on the ground and actuate the electrovalve to dump the bin, thereby forming another pile of leaves on the ground.

As indicated above, the machine also comprises means to dig beets from the soil and to convey the dug beets appropriately. The digging means comprise pairs of ploughs and/or discs 89 that penetrate the soil. Relative to the length of the machine, the digging means are disposed between the front wheels 3 and the rear wheels 6. In the illustrated embodiment, the machine has six pairs of ploughs 89 which are transversely aligned with each other. In each pair, the ploughs are spaced from each other and inclined downwardly toward each other and are rearwardly convergent with respect to the direction of travel of the machine. The pairs of ploughs 89 are mounted on supports 90 carried by a common arm 91 in such a manner as to be regulable as to height. To this end, arm 91 pivots with respect to chassis 2 about fixed coaxial pivots 92.

The beets which are thus dug are then conveyed by two openwork conveyor rotors 93 which are horizontally disposed or slightly inclined with regard to the horizontal. Rotors 93 are mounted each behind three pairs of ploughs 89 and are disposed symmetrically on opposite sides of the longitudinal midplane of the machine, in front of the rear wheels 6.

Each rotor 93 is mounted on a shaft 94 which is driven by change-of-direction gearing 95 which is in turn mounted on the pivotal arm 91 that carries the ploughs 89. The reduction gearing 95 of the two rotors is mechanically interconnected by couplings 96 to a common drive shaft 97 driven by motor 4 through a drive train including an endless driven chain 98 carried by sprockets 99 and 100.

It is important to note that the two rotors 93 turn in opposite directions in a manner such as to move the dug beets centrally and toward the rear between the rotors and to feed the beets to vertical elevators 102 disposed behind rotors 93 symmetrically with respect to the longitudinal midplane of the machine and quite close to that midplane. Thus, as seen for example in FIG. 6, the upper rotor 93 turns counterclockwise while the lower rotor 93 turns clockwise.

Each rotor 93 is provided with an openwork grill 101 to retain the beets on the rotor. Each grill 101 is disposed perpendicular to its associated rotor and is inclined obliquely or tangentially with respect to the rotor. Such a grill 101 disposed adjacent the periphery of the rotor serves to prevent beets from falling from the rotor and also helps to remove dirt from the beets.

Figure 5:
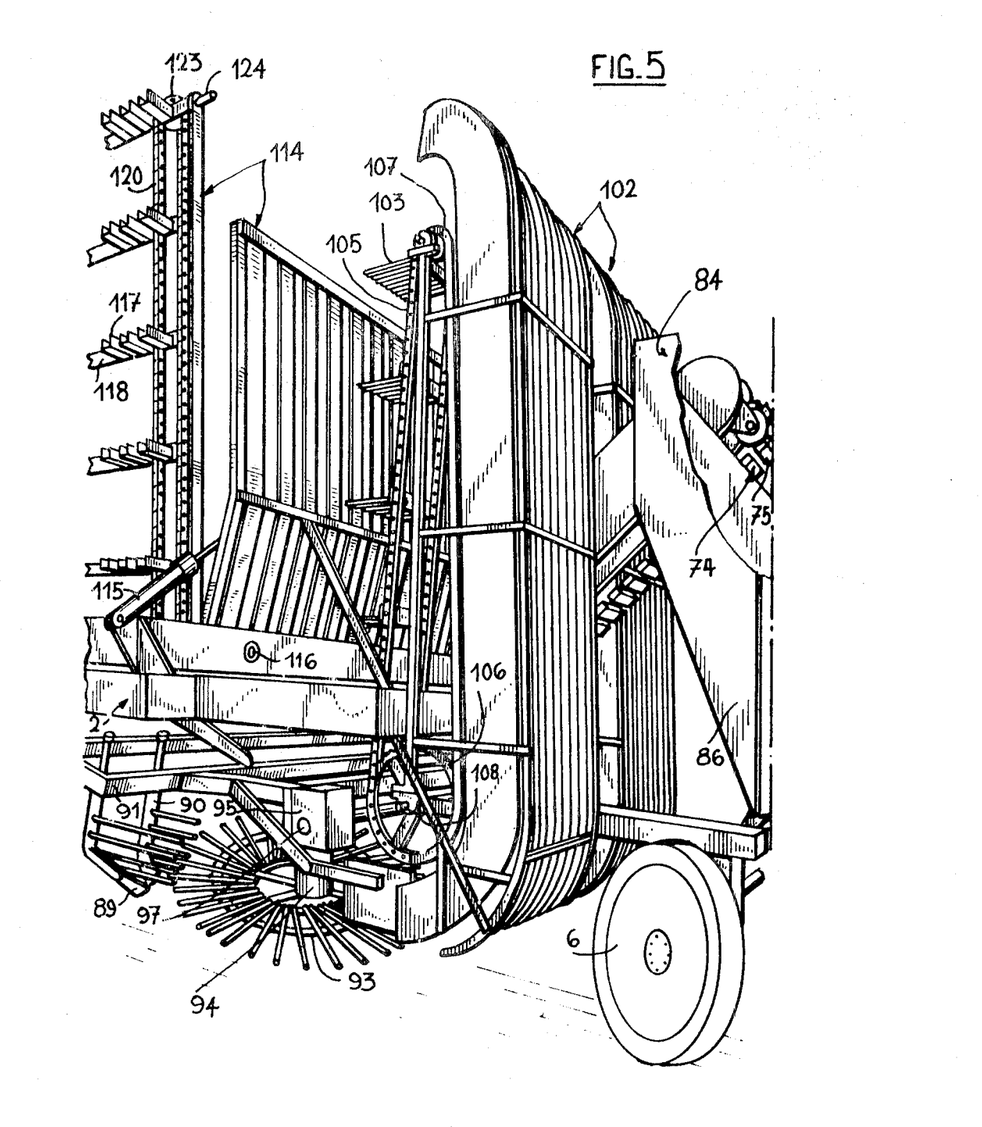
FIG. 5 is a fragmentary perspective view of the midportion of the machine.
Figure 6:
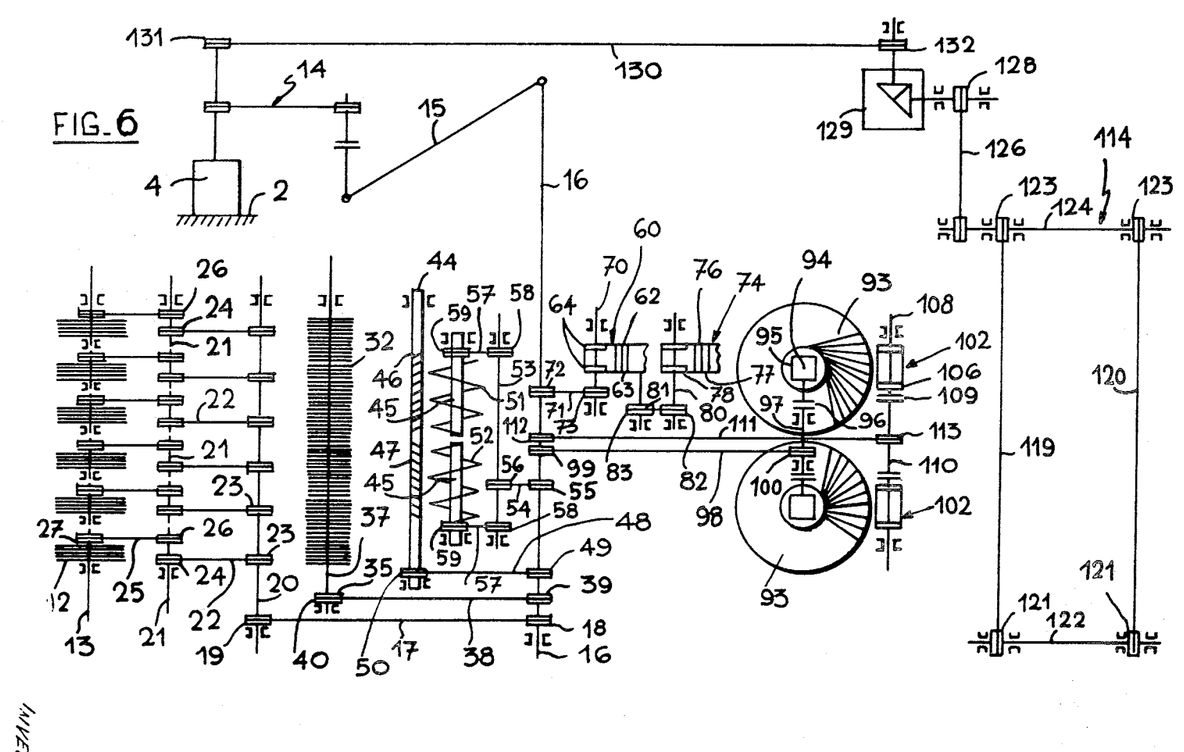
FIG. 6 is a schematic diagram of the drive mechanisms of the embodiment of FIGS. 1—5.
Figure 7:
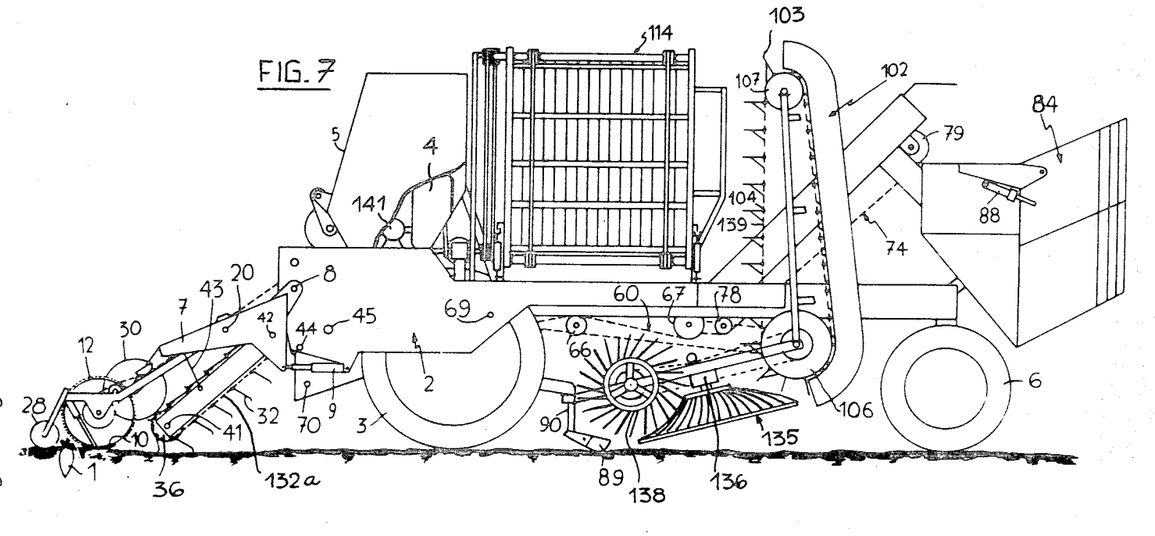
FIG. 7 is a side elevational view similar to FIG. 1 but partly broken away and showing a second embodiment of the invention.

The elevators 102 are disposed in front of the rear wheels and are of the shelf type as best seen in FIG. 5. Each shelf 103 is comprised of a plurality of parallel rods in transverse alignment with each other and carried on shafts 104 that interconnect endless synchronously driven chains 105. The chains 105 of each elevator 102 are mounted on lower drive sprockets 106 and upper idler sprockets 107. The drive shafts 108 of the sprockets 106 of the two elevators 102 are interconnected for example by couplings 109 to a common drive shaft 110 which in turn is driven by motor 4 through a drive train including an endless drive chain 111 carried by sprockets 112 and 113.

Beets elevated by the elevators 102 are discharged from an upper portion of the elevators into an intermediate collection bin 114 mounted fixedly on chassis 2. Bin 114 is disposed above ploughs 89 and rotors 93 immediately behind the driver's cab 5, on the midportion of the machine. Bin 114 is also symmetrical with respect to the longitudinal midplane of the machine and can pivot laterally relative to the chassis under the control of hydraulic jacks 115 fed with hydraulic fluid under pressure under the control of an electrovalve actuated from the cab 5. To this end, bin 114 is mounted for vertical swinging movement on and about a fixed horizontal pivotal shaft 116.

Alternatively, the bin 114 can be unloaded without swinging, by means of discharge scrapers 117 carried on bars 118 interconnecting endless parallel synchronously driven chains 119 and 120. Discharge scrapers 117 in their operative position shown in FIG. 5 are parallel to each other and horizontal and extend in horizontal series parallel to the longitudinal midplane of the machine. They extend along the bottom and one of the sidewalls of bin 114, the chains 119 and 120 being disposed adjacent the front and rear walls of bin 114. The chains 119 and 120 are mounted on drive sprockets 123 keyed to a drive shaft 124 and on idler sprockets 121 on idler shafts 122. See especially FIGS. 5 and 6.

The discharge scrapers 117 are driven by motor 4 under the control for example of a pushbutton mounted on the dashboard in cab 5. Drive shaft 124 for chains 119 and 120 is mechanically connected to a first lateral transmission shaft 125 by a transmission including an endless transmission chain 126 carried by sprockets 127 and 128. Shaft 125 is driven by the output shaft of a reducer 129 comprising change angle gearing whose input shaft is driven by motor 4 by means of a chain transmission including an endless chain 130 carried by sprockets 131 and 132. In this manner, rotation of the motor drives the shaft 124 and the chains 119 and 120 of the scrapers 117.

According to a desirable alternative embodiment, the rotors 93 are each individually driven by a fluid motor by means of a pump driven by motor 4. These fluid motors may be hydraulic, pneumatic or oleopneumatic. It is also desirable that the toothed wheels 12 of the rotatable feelers, the drive sprockets 35 of the gathering rakes 32, the helical conveyors 44 and 45, the drive sprocket 64 of the first conveyor 60, the drive sprocket 78 of the second conveyor 74, the drive sprockets 106 of the elevators 102, and the drive sprockets 121 of the discharge scrapers 117 of bin 114 be driven individually by fluid motors through the aforesaid pump. In this way, complex mechanical transmissions can be avoided, between motor 4 and the various driven parts of the machine, so that the construction and repair of the machine are simplified and the weight of the machine is reduced, by thus replacing mechanical transmissions with fluid circuitry.

A second principal form of the invention is shown in FIGS. 7 to 10. In this embodiment, the gathering rakes 32 are driven by two flexible endless belts 132a which may for example be natural or synthetic rubber. These belts may be so formed as to present lugs (not shown) engaging in corresponding recesses in the drive wheels 35 which in turn are keyed to the driven shaft of a fluid motor (not shown) driven by pump 141 which in turn is driven by motor 4.

Similarly, the toothed wheels 12 of the rotatable feelers may be driven synchronously by means of another fluid motor, as may also the screw conveyors 44 and 45, all these motors being driven by the aforesaid pump 141.

In the same fashion, the longitudinally extending conveyors 60 and 74 may be comprised of pairs of flexible belts, of rubber or the like, like the belts 132a, and may be driven by fluid motors from pump 141.

Figure 8:
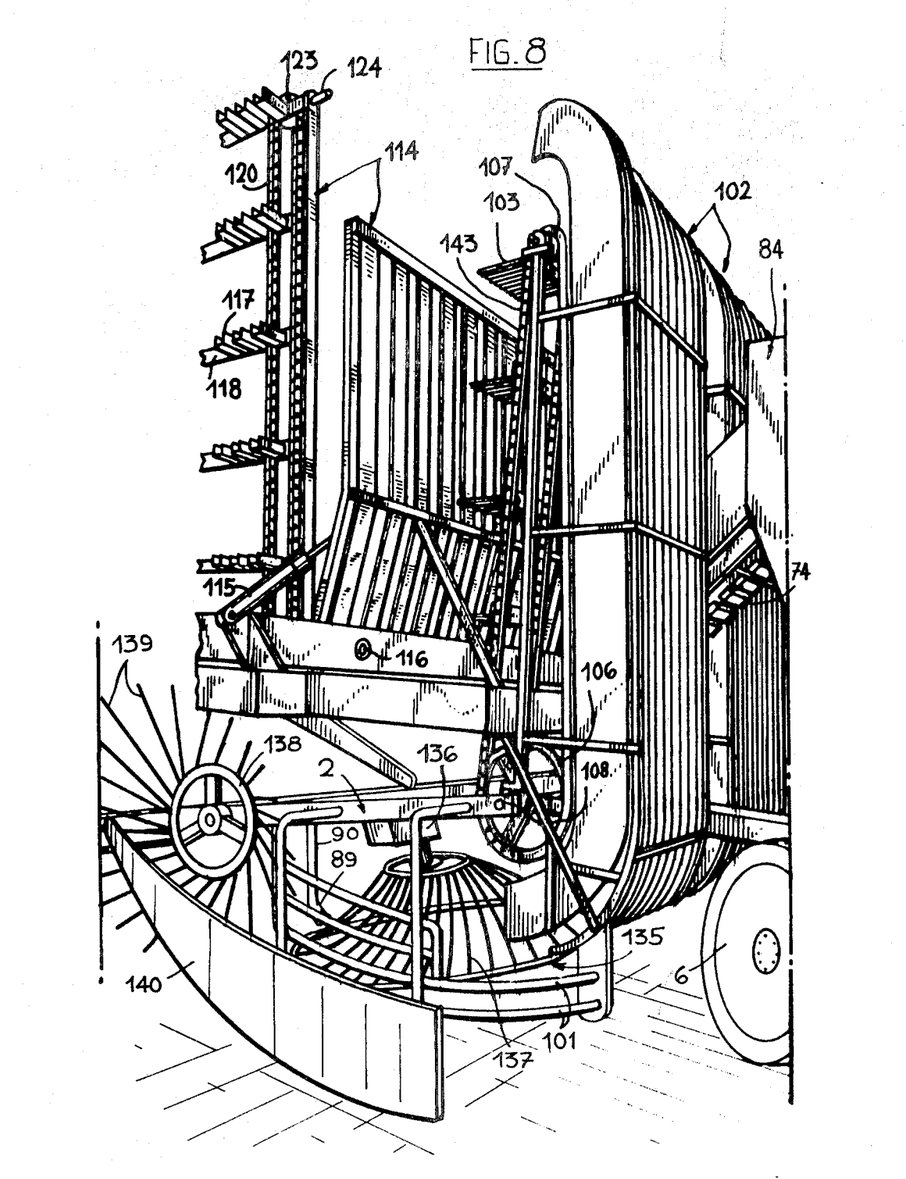
FIG. 8 is a fragmentary perspective view which is related to FIG. 7 as FIG. 5 is related to FIG. 1.
Figure 9:
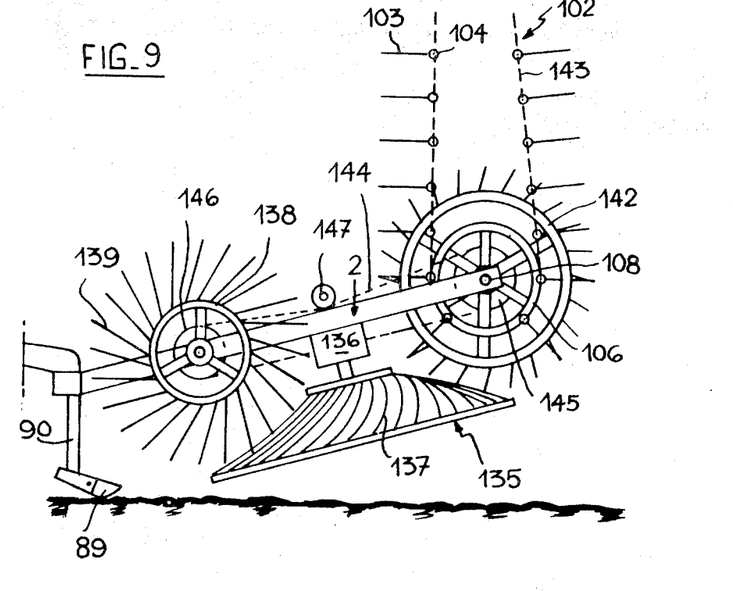
FIG. 9 is a side elevational view of the rotary conveyor of the embodiment of FIGS. 7 and 8.
Figure 10:
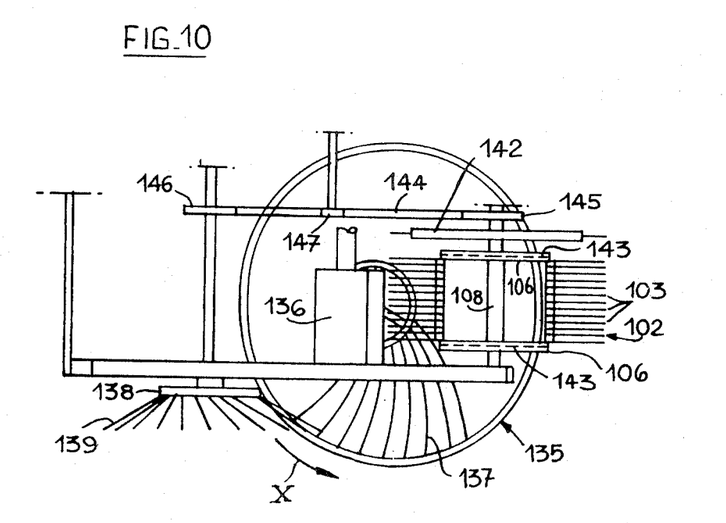
FIG. 10 is a plan view of the structure of FIG. 9.

Turning now to the rear portion of the machine of FIGS. 7-10, it will be noted that the rotors corresponding to the rotors 93 of the preceding embodiment have a different configuration. In FIGS. 7-10, the openwork rotors 135 have the same general position and orientation as in the preceding embodiment, but are separately driven by fluid motors 136 fed from pump 141. Each of the rotors 135 is so constructed as to flare toward its base. As best seen in FIGS. 9 and 10, the lateral surface of each rotor 135 is curbed so as to flare toward the base and is constituted by a series of rods 137 that are regularly spaced and are curved so as to extend downwardly and rearwardly with respect to the direction of rotation.

A disc or rotor 138 is provided forwardly of each rotor 135, in the vicinity of the ploughs 89. This disc 138 is provided at its periphery with equally spaced outwardly extending rods 139 and is preferably adjustable in position relative to chassis 2 of the machine. The rods 139 are preferably inclined slightly toward the rear with respect to the direction of rotation of disc 138, which is counterclockwise as seen in FIG. 9. The rods 139 are also preferably inclined toward the outer side of the machine so that they lie substantially on the surface of a cone. The disc 138 thus functions to guide and retain beets on rotors 135 and also help clean the dirt from the beets.

This configuration of the rotors 135, flaring toward the base, facilitates the movement of the beets toward the periphery of the rotor between the ploughs 89 and the elevators 102. As seen in FIG. 8, an openwork grill 101 is provided along and about each rotor 135 between the disc 138 and the elevator 102, so as to retain the beets on the rotor. A curved protective lateral skirt 140 of flexible material is preferably provided about each rotor 135 and its associated disc 138.

The rods 104 which carry the shelves 103 of the elevator 102 are fixed to two flexible endless belts 143 similar to belts 132a of the rakes 32. These belts 143 are mounted on upper drive wheels 107 and lower idler wheels 106, the wheels 107 being synchronously driven by a fluid motor (not shown) fed by pump 141.

A rotatable disc 142 analogous to disc 138 is provided to the rear of each rotor 135 in the vicinity of elevator 102. It serves to facilitate transfer of the beets from the rotor to the elevator and may be keyed to shaft 108 which interconnects the wheels 106 of the elevator.

The disc 138 is driven synchronously with the associated disc 142 and elevator 102, by means of a flexible band or chain 144 mounted on wheels 145 and 146 keyed respectively on the shaft 108 of the corresponding elevator and disc 138. The tension of belt or chain 144 is controlled by a belt tensioner 147.

In another variation, the flexible belts of the rakes 32 and conveyors 60 and 74 and elevators 102 may be provided with pockets in which engage corresponding lugs on the associated drive wheels.

Of course, it will be understood that in the embodiment of FIGS. 7 to 10, the various driven members can be driven by mechanical transmissions of fluid transmissions. Also, various analogous conveyor and elevator means for the leaves and beets may be chosen.

Furthermore, although the present invention has been described in connection with digging beets, it is to be understood that it may be used also for the digging of other underground objects.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A machine for digging beets or the like in a field of crops, simultaneously along several contiguous parallel rows of beets, said machine comprising a chassis movable over the field in the direction of said rows, and on the chassis:
    a. a plurality of transverse knives to cut the leaves of the beets of said contiguous rows,
    b. in front of each knife, a rotary beet-feeler carrying this knife and connected to said framework for rolling on the ground and being vertically movable relative to the chassis so as to dispose this knife at the level of the base of the leaves to be cut,
    c. endless collecting rakes behind said knives and transversely aligned, for collecting the cut leaves and carrying the same rearwardly and upwardly,
    d. a pair of transverse screw conveyors having respectively helical flights of opposite hand and being coaxially aligned with one another on opposite sides of the median plane of the chassis under the rear end of said endless collecting rakes, whereby the cut leaves are delivered from said endless rakes onto said transverse screw conveyors,
    e. means to rotate both screw conveyors in a direction to move the cut leaves toward the median plane of the chassis,
    f. at least one endless longitudinal conveyor extending substantially along the median plane of the framework with its forward end under both screw conveyors, whereby the cut leaves are delivered from said screw conveyors onto said endless longitudinal conveyor and are carried rearwardly,
    g. a leaf-collecting bin under the rear end of said at least one endless longitudinal conveyor, said bin being substantially symmetrical to the median plane of said chassis,
    h. transversely aligned behind said knives, a plurality of pairs of diggers for penetrating the soil and digging the beets of said contiguous rows, of which the leaves have been cut,
    i. at least two rotary conveyor wheels behind said pairs of diggers, said wheels being symmetrical to said median plane of the chassis, on which the beets dug respectively by said pairs of diggers are delivered,
    j. means to rotate both conveyor wheels in opposite directions to convey the dug beets toward the median plane of the framework and rearwardly,
    k. an endless elevator behind each of said two rotary conveyor wheels, both elevators being symmetrical to the median plane of the chassis with their lower parts substantially at the level of the rear parts of said conveyor wheels, so that the dug beets on said conveyor wheels are delivered on said elevators by rotation of said conveyor wheels,
    l. a beet-collecting bin under the upper parts of said elevators, this bin being substantially symmetrical to the median plane of said chassis.

2. A machine as claimed in claim 1, having front wheels and back wheels for moving the chassis over the field, said rotary beet-feelers, transverse knives and endless collecting rakes being in front of the front wheels, and said pairs of diggers being adjacent but behind the front wheels.

3. A machine as claimed in claim 2, wherein the leaf-collecting bin is at the rear of the chassis, both elevators are substantially vertical and are in front of the back wheels, and the beet-collecting bin is between the front wheels and the back wheels and substantially above said pairs of diggers and rotary conveyor wheels.

4. A machine as claimed in claim 1, comprising further, in front of and substantially against said pair of helical screw conveyors and under the rear end of said endless collecting rakes, another pair of transverse coaxial helical screw conveyors having respectively helical flights of opposite hand coaxially aligned with one another on opposite sides of the median plane of the chassis, said helical flights of said another pair of screw conveyors having a diameter smaller than the diameter of the helical flights of the first-mentioned pair of screw conveyors, drive means for said another pair of screw conveyors to rotate said another pair of screw conveyors in a direction such that the leaves delivered from the endless collecting rakes onto both pairs of transverse helical screw conveyors are conveyed by said pairs towards the median plane of the chassis.

5. A machine as claimed in claim 1, wherein each of said rotary conveyor wheels is of openwork construction comprising a plurality of rods regularly distributed and curved in such a way as to recede from the axis of said conveyor wheel downward and rearward relative to the direction of rotation of said conveyor wheel.

6. A machine as claimed in claim 1, further comprising, in the vicinity of each rotary conveyor wheel and near said pairs of diggers, a rotor and a driving means for said rotor, said rotor guiding and retaining the beets on said conveyor wheel and also cleaning the dirt from said beets.

7. A machine as claimed in claim 6, further comprising, near each elevator and in the vicinity of the corresponding rotary conveyor wheel, another rotor and a driving means for said another rotor so that the latter guides the beets passing from the rotary conveyor wheel onto the elevator, and to clean the dirt from said beets.

8. A machine as claimed in 7, wherein said rotors have a plurality of rods regularly distributed and directed rearward relative to the direction of said rotors.

9. A machine as claimed in claim 8, wherein said rods of the rotors are inclined toward the corresponding lateral side of the chassis, so as to lie substantially on a frustoconical surface.

10. A machine as claimed in claim 1, wherein the leaf-collecting bin and the beet-collecting bin are connected to the chassis for lateral pivoting movement, the machine further comprising hydraulic jack means interposed between said bins and said chassis for pivoting said bins when actuated, a reservoir containing fluid under pressure for said jack means, an electrovalve connecting said reservoir to said jack means to deliver fluid toward said jack means to actuate said jack means, a lever attached to said valve to actuate said valve when displaced from a position of rest, a spring maintaining said lever in said position of rest for which said lever projects laterally of the chassis at a predetermined height above the field, so that this lever is displaced by a heap of leaves or beets against the action of said spring.

11. A machine as claimed in claim 2, wherein the front wheels are propulsive and the back wheels are steering.

* * * * *